United States Patent
Lettis et al.

(10) Patent No.: US 11,479,164 B2
(45) Date of Patent: Oct. 25, 2022

(54) SEALING MEANS, BASE ASSEMBLY WITH SUCH A SEALING MEANS AND REAR VIEW DEVICE WITH SUCH A BASE ASSEMBLY

(71) Applicant: MOTHERSON INNOVATIONS COMPANY LIMITED, London (GB)

(72) Inventors: Andrew Lettis, Portchester (GB); Callum Scott-Collins, Portchester (GB); Graham Rehill, Portchester (GB)

(73) Assignee: Motherson Innovations Company Limited, London (GB)

( * ) Notice: Subject to any disclaimer, the term of this patent is extended or adjusted under 35 U.S.C. 154(b) by 706 days.

(21) Appl. No.: 16/459,051

(22) Filed: Jul. 1, 2019

(65) Prior Publication Data

US 2020/0001772 A1    Jan. 2, 2020

(30) Foreign Application Priority Data

Jul. 2, 2018    (DE) ...................... 10 2018 116 011.9

(51) Int. Cl.
| | |
|---|---|
| *B60R 1/06* | (2006.01) |
| *B60Q 1/00* | (2006.01) |
| *B60Q 1/26* | (2006.01) |
| *B60R 1/12* | (2006.01) |

(52) U.S. Cl.
CPC ......... *B60Q 1/0023* (2013.01); *B60Q 1/2615* (2013.01); *B60R 1/06* (2013.01); *B60R 2001/1253* (2013.01)

(58) Field of Classification Search
CPC ...... B60Q 1/0023; B60Q 1/2615; B60Q 1/06; B60R 2001/1253
See application file for complete search history.

(56) References Cited

U.S. PATENT DOCUMENTS

| | | | |
|---|---|---|---|
| 9,994,155 B2 | 6/2018 | Nishimoto et al. | |
| 2004/0121820 A1 | 6/2004 | Unmo et al. | |
| 2015/0097955 A1* | 4/2015 | De Wind | B60R 1/12 359/872 |
| 2015/0224930 A1* | 8/2015 | Foote | B60R 1/074 359/872 |
| 2017/0253184 A1 | 9/2017 | Nishimoto et al. | |

(Continued)

FOREIGN PATENT DOCUMENTS

| | | |
|---|---|---|
| CN | 109017576 A | 12/2018 |
| DE | 102018116011 B4 | 7/2020 |

(Continued)

OTHER PUBLICATIONS

Examination Report dated Nov. 27, 2019 of Great Britain application No. GB 1908758.4.

(Continued)

*Primary Examiner* — Gilbert Y Lee
(74) *Attorney, Agent, or Firm* — Jones Day

(57) ABSTRACT

A sealing means of a pivot joint system between a base assembly and a head assembly of a rear view device, including a two-component pivot seal including a hard component including at least one of one or more attachment and holding means for at least one of attachment of the sealing means to the base assembly and holding at least one cable, and a soft component. A base assembly and a rearview device are also described.

11 Claims, 5 Drawing Sheets

(56) References Cited

U.S. PATENT DOCUMENTS

| | | | |
|---|---|---|---|
| 2018/0086272 A1* | 3/2018 | De Wind | B60R 1/12 |
| 2019/0176706 A1 | 6/2019 | Hamada | |
| 2019/0193635 A1* | 6/2019 | Bortolon | B60R 1/074 |
| 2021/0031694 A1* | 2/2021 | Bhaskar | B60Q 1/0088 |

FOREIGN PATENT DOCUMENTS

| | | |
|---|---|---|
| EP | 3501899 A1 | 6/2019 |
| GB | 1450499 A | 9/1976 |
| JP | 2014-076699 A | 5/2014 |
| WO | WO 91/04172 A1 | 4/1991 |
| WO | WO 1991/004172 | 4/1991 |

OTHER PUBLICATIONS

German Office Action dated Jan. 11, 2019 of German application No. DE 102018116011.9.
German Office Action dated Jan. 11, 2019 of the priority application DE 10 2018 116 011.9.
French Office Action with Written Opinion and Preliminary Research Report dated Dec. 10, 2020 of application No. FR 1906716.

* cited by examiner

SEALING MEANS, BASE ASSEMBLY WITH SUCH A SEALING MEANS AND REAR VIEW DEVICE WITH SUCH A BASE ASSEMBLY

CROSS-REFERENCE TO RELATED APPLICATION

This application claims the benefit of foreign priority to German Patent Application No. DE 10 2018 116 011.9, filed Jul. 2, 2019, which is hereby incorporated by reference in its entirety for all purposes.

BACKGROUND

1. Field of the Invention

The present disclosure generally describes a sealing means, a base assembly with such sealing means and a rear view device with such a base assembly.

2. Related Art

The term "rear view" is generally defined as a view of the surrounding area, which is not in the field of view of a driver of a vehicle, i.e. the directions opposing, left, right, below and above of the viewing direction, but can also include the view in the direction of the viewing direction of the driver and/or any combinations of the directions. The rear view can be achieved via a reflective element like a mirror and/or an image acquisition means like a camera.

A rear view device typically includes a base assembly to be attached to a vehicle and a head assembly to be moveable relative to the base assembly. Generally, the head assembly of a rear view device can be rotated between at least a driving position and a parking position.

SUMMARY

In one aspect, a sealing means of a pivot joint system between a base assembly and a head assembly of a rear view device includes a two-component pivot seal with a hard component and a soft component, and the hard component is provided with one or more attachment and/or holding means for attachment of the sealing means to the base assembly and for holding at least one cable.

In an example, the attachment and/or holding means comprises one or more clips, and/or the attachment and/or holding means is adapted to engage a base frame of the base assembly, and/or the attachment and/or holding means is adapted to hold and guide a cable of a functional module, in particular of a camera system, of the base assembly.

It is also proposed that the sealing means and/or the soft component of the sealing means has a conical form, with preferably the longitudinal axis of the conical form being adapted to fall together with the pivot axis of the pivot joint system, and/or with preferably the sealing means and/or the soft component of the sealing means having a ring shape, and/or with preferably the attachment and/or holding means comprising at least 2 clips in a first half of the conus and/or ring adapted to face away from a vehicle to which the rear view device is attached.

Further, it is proposed that the soft component is adapted to engage the base assembly, in particular a base cover of the base assembly.

In another object, a base assembly which facilitates assembly of the rear view device includes a base frame, a base cover housing the base frame at least partly, at least one functional module and a pivot joint base system configured to cooperate with a pivot joint head system of a head assembly to be moveably attached to the base assembly, where the pivot joint base system comprises the sealing means.

It is proposed that the functional module is releasable attached to the base frame, preferably at the end of the base frame facing towards a vehicle to which the base assembly is to be attached, and/or the hard component of the sealing means is releasable attached to the base frame, preferably at the end of the base frame facing away from a vehicle to which the base assembly is to be attached.

Embodiments of the base assembly can be characterized in that the sealing means is concentrically arranged around the pivot axis of the pivot joint system, preferably in form of a ring and/or around a bayonet tower and/or torsion spring of the pivot joint system.

In addition, it is proposed that the one or more clips is/are arranges in a first half of the ring.

It is also proposed that the functional module is provided in form of a camera system, comprising a camera, a camera connector and a cable, which is adapted to be hold by the one or more attachment and/or holding means of the sealing means.

The base assembly of the invention can also be characterized in that the one or more attachment and/or holding means of the sealing means is adapted to guide the cable around at least part of the sealing means, with preferably the cable being guided around at least around the first half of the ring, and/or with preferably the cable being guided to have a bending radius of more than around 15 mm.

In an example, the cable is guided from the upper side of the base frame, with the upper side being preferably the side to which the camera connector is attached, to the lower side of the base frame, with the lower side being preferably the side to which the camera is attached, around at least half of the circumference of the sealing means, preferably around the ring half facing away from the camera, and into the vehicle when the base assembly is attached to the vehicle.

It is also proposed that the soft component engages the rim of the base cover at the pivot joint system end.

In another aspect, a rear view device includes a head assembly movably attached to the base assembly.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

Figure 1:
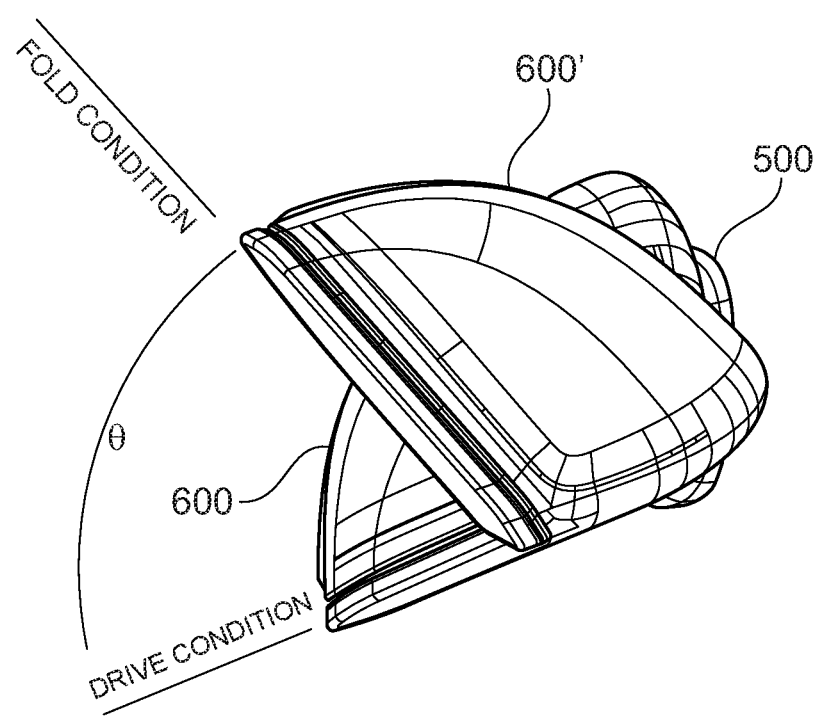
FIG. 1 is a perspective view of a rear view device, in the drive condition and the fold condition.

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

FIG. 1 shows a rear view device of the invention with a head assembly 600 and a base assembly 500 connected via a pivot joint system comprising in particular a sealing means or pivot seal according to the invention. A respective pivot joint system is described in detail in the international patent application PCT/EP 2018/063665, which is hereby incorporated herein by reference.

The rear view device of FIG. 1 is illustrated in a drive condition of the head assembly 600 as well as a knocked forward or fold condition of the head assembly 600' relative to a base assembly 500 to be attached to a vehicle (not shown).

Figure 2:
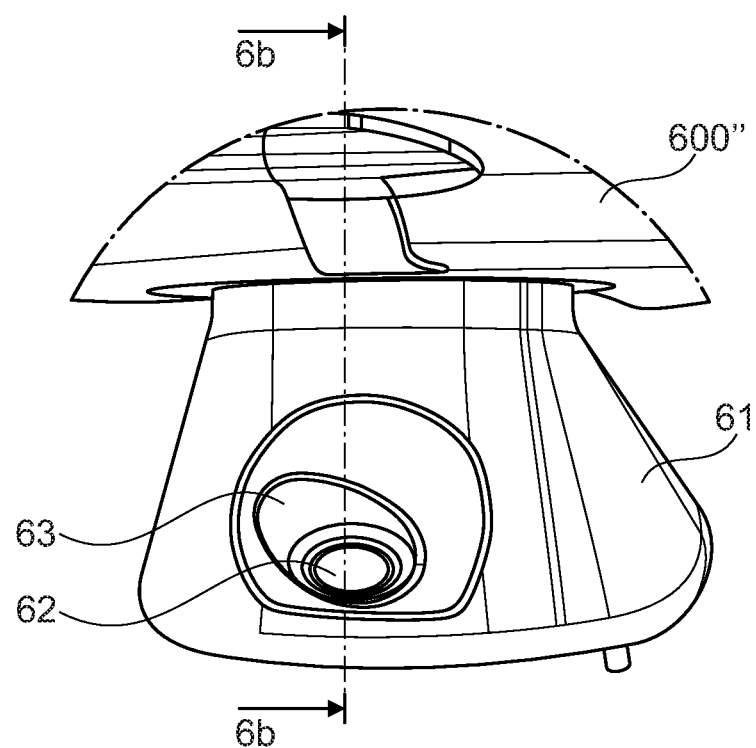
FIG. 2 is a front view of a camera located within a base assembly of the invention.
Figure 3:
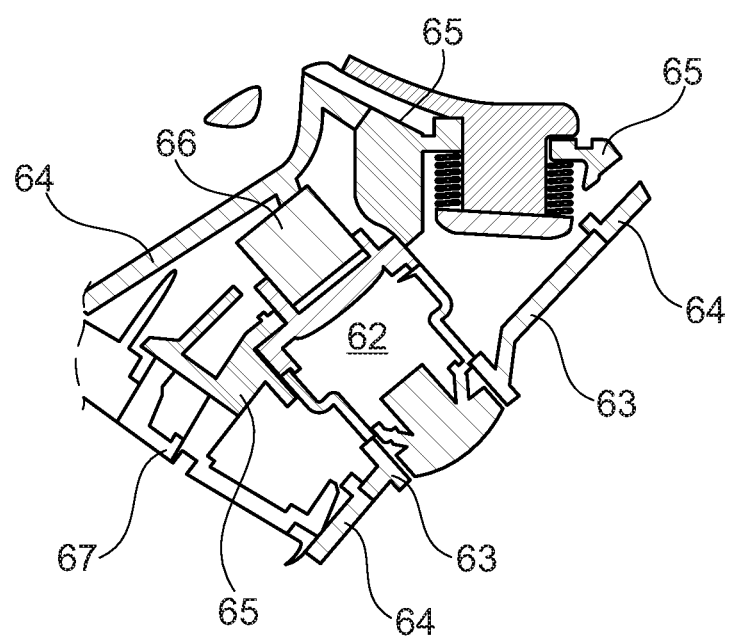
FIG. 3 is a section view along the line 6b-6b in FIG. 2.

Referring to FIGS. 2 and 3, due to the movement of the head assembly 600", a non-moving area for securing a camera 62 is beneficial. In this embodiment, the camera 62 is positioned in the base assembly 61 and fixed on a base frame 65 with a camera connector 66. The camera 62 is covered by a base cap 63, and the base assembly 61 is covered by a base cover 64 and secured via a gasket 67 to a motor vehicle (not shown).

Figure 4:
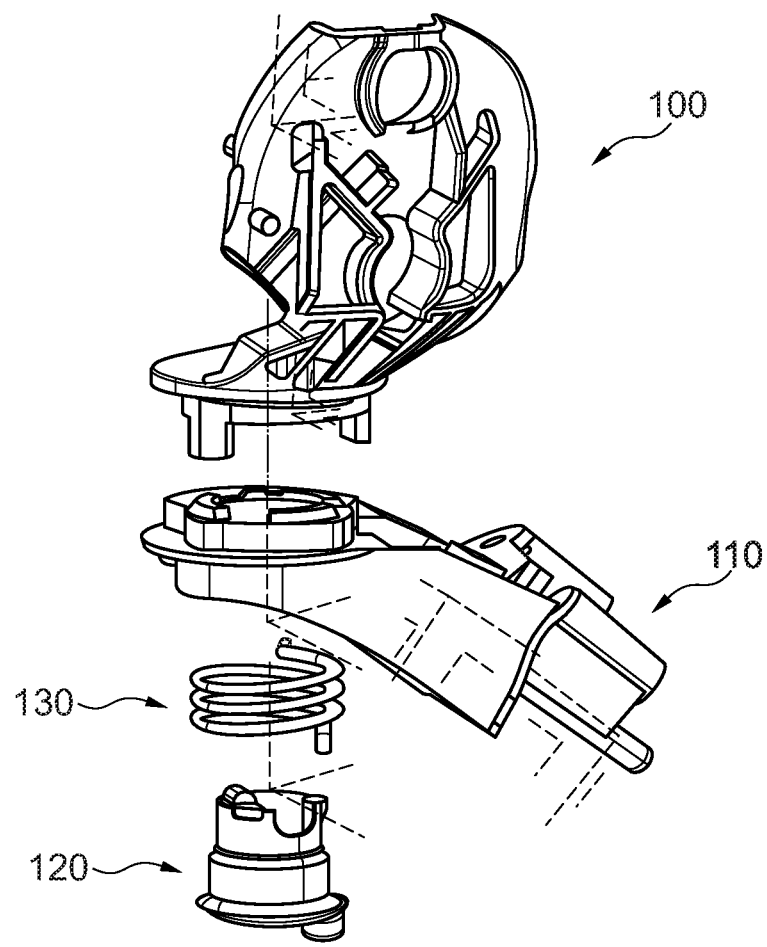
FIG. 4 is an explosion view of some internal parts of a rear view device of the invention.
Figure 5:
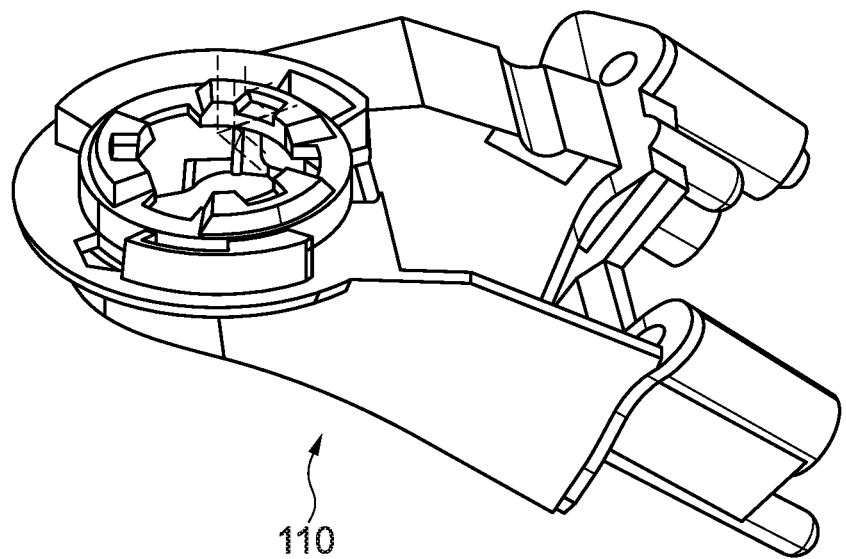
FIG. 5 is a perspective top view of a base frame of a rear view device of FIG. 4.

FIG. 4 shows a pivot joint system comprising a case frame 100 of the head assembly, a base frame 110 of the base assembly with a bayonet tower 120 and spring 130. The base frame is shown in further detail in FIG. 5.

Figure 6:
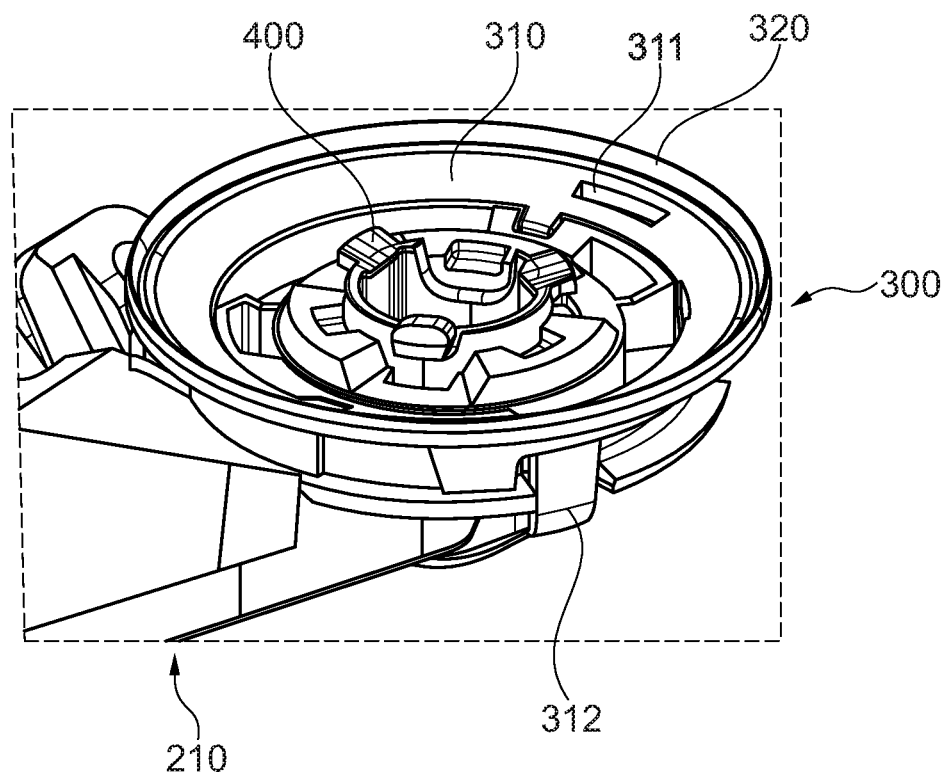
FIG. 6 is a perspective top view of an alternative base frame with sealing means according to the invention.

FIG. 6 shows an alternative base frame 210 with a sealing means 300 of the invention and a bayonet tower 400. Said sealing means 300 comprises a hard part 310 and a soft part 320. The hard part 310 fulfills attachment and/or holding functions as illustrated below and the soft part 320 enables a compensation of tolerances, in addition to the sealing means 300 providing a pivot seal of a pivot joint between a base assembly and a head assembly of a rear view device. Thus, the sealing means 300 is provided in form of a two component gasket in order to provide a multitude of functions, with the hard part 310 being provided with clips 311, 312 for that purpose.

These clips 311, 312 fulfill more than one function. On the one hand, the clips 311, 312 allow for a clip connection of the sealing means 300 with the base frame 210, and on the other hand the clips 311, 312 are adapted to hold a cable 430 for a camera 420 attached to the base frame 210 and running from a camera connector 422 into a vehicle to which the rear view device is attached at its base assembly 200.

Figure 7A:
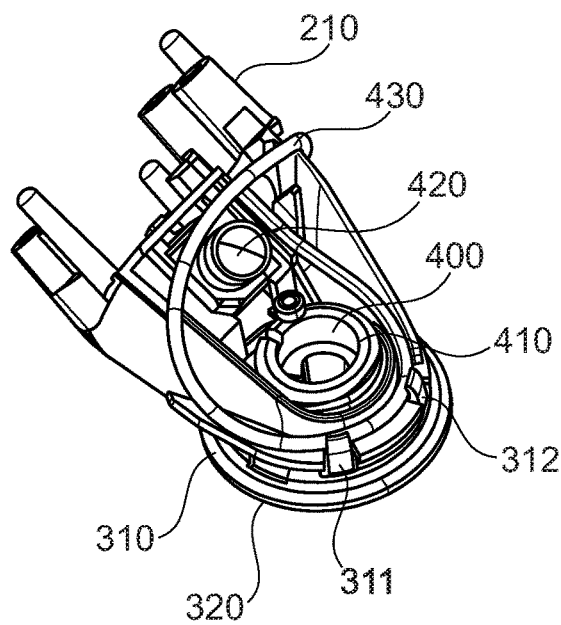
FIGS. 7*a* and 7*b* are different perspective views of the base frame with the sealing means of FIG. 6 together with a camera assembly.
Figure 7B:
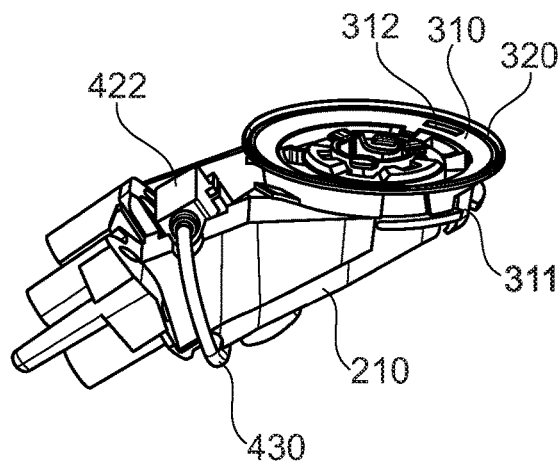

While FIGS. 6 and 7*b* show best the clip connection of the sealing element 300 to the base frame 210 via the clips 311, 312; it is FIG. 7*a* from which the clip holding function of the cable 430 can be best seen. The holding of the cable 430 via the clips 311, 312 avoids damages of the cable 430 due to too strong bending forced acting on the cable 430. The curvature of the cable 430, is sensible and the cable radius has to be above around 15 mm to avoid damages. By wrapping the cable 430 around bayonet tower 400 as well as part of the base frame 210 and holding it in position with the help of the clips 311, 312 a stable and long-life base assembly 200 is provided with the invention, which is also easy to assemble.

Figure 8:
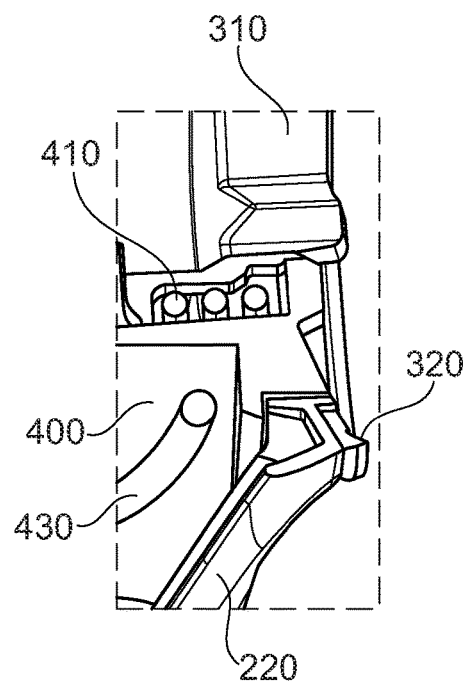
FIG. 8 is a cross section through a base assembly of the invention.
Figure 9:
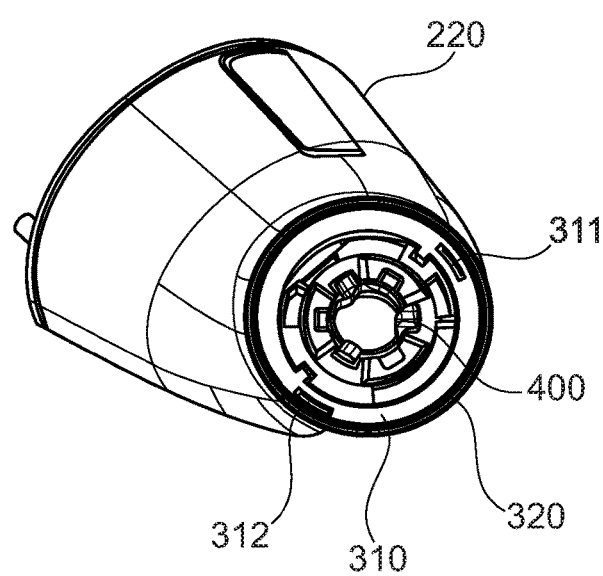
FIG. 9 is a perspective view of the base assembly of FIG. 8.

In particular the cable 430 and the camera connector 422 are protected by a base cover 220 the upper rim of which is engaged by the soft part 320 of the sealing means 300, see FIGS. 8 and 9.

Different functions and devices can be incorporated into and/or controlled with the help of rear view devices, in addition or instead of cameras.

Especially useful are functions and devices to enhance, extend and/or sustain the functionality of the rear view device during normal or extreme conditions. This may include heating and/or cooling means, cleaning means such as wipers, liquid and/or gaseous sprays, actuator means for moving the rear view device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rear view devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rear view device including an illumination device fulfilling the brake light functions is disclosed in German patent application No. 102012108488, filed on Sep. 11, 2012 for REAR VIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rear view device is disclosed in German patent application No. 102012107833, filed on Aug. 24, 2012 for ILLUMINATION DEVICE AND REAR VIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rear view device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rear view device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further a light guiding device for an illumination device, in particular for a motor vehicle or a display device, in a rear view device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rear view device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rear view device or a footwell device of a vehicle, including at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rear view device of a motor vehicle, including a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REAR VIEW ASSEMBLY WITH CAMERA AND LENS WIPING SYSTEM, which are all hereby incorporated herein by reference.

The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

61 base assembly
62 camera 63 base cap
64 base cover
65 base frame
66 camera connector
67 gasket
100 case frame
110 base frame
120 bayonet tower
130 torsion spring
200 base assembly
210 base frame
220 base cover
300 sealing means
310 hard component
311 clips
312 clips
320 soft component
400 bayonet tower
410 spring
420 camera
422 camera connector
430 cable
500 base assembly
600 head assembly in driving position
600' head assembly in knocked out position
600" head assembly

What is claimed is:

1. A base assembly of an exterior rear view device, comprising:
   a base frame;
   a base cover housing the base frame at least partly;
   at least one functional module; and
   a pivot joint base system configured to cooperate with a pivot joint head system of a head assembly to be moveably attached to the base assembly,
   wherein the pivot joint base system comprises a sealing means between the base assembly and the head assembly, the sealing means comprising,
      a two-component pivot seal comprising:
         a hard component comprising at least one of one or more attachment and holding means for at least one of attachment of the sealing means to the base assembly and holding at least one cable; and
         a soft component;
   wherein the at least one of the one or more attachment and holding means of the sealing means is adapted to guide the at least one cable around at least part of the sealing means, and
   at least one of
      the at least one cable is guided around at least a first half of the ring, and
      the at least one cable is guided to have a bending radius of more than approximately 15 mm.

2. The base assembly according to claim 1, wherein at least one of:
   the at least one of the attachment and holding means comprises one or more clips,
   the at least one of the attachment and holding means is adapted to engage a base frame of the base assembly, and
   the at least one of the attachment and holding means is adapted to hold and guide a cable of a functional module including a camera system of the base assembly.

3. The base assembly according to claim 1, wherein
   the soft component of the sealing means comprises a conical form, and
   at least one of
      the longitudinal axis of the conical form is adapted to fall together with a pivot axis of the pivot joint system,
      the at least one of the sealing means and the soft component comprises a ring shape, and
      the at least one of the attachment and holding means comprises at least two clips in a first half of at least one of the conus and ring adapted to face away from a vehicle to which the rear view device is attached.

4. A base assembly according to claim 1, wherein the soft component is adapted to engage the base assembly and the base cover of the base assembly.

5. The base assembly according to claim 1, wherein at least one of
   the functional module is releasable attached to the base frame at an end of the base frame facing towards a vehicle to which the base assembly is configured to be attached, and
   the hard component of the sealing means is releasable attached to the base frame at an end of the base frame facing away from a vehicle to which the base assembly is configured to be attached.

6. The base assembly according to claim 1, wherein the sealing means is concentrically arranged around the pivot axis of the pivot joint system by at least one of a ring and around at least one of a bayonet tower and a torsion spring of the pivot joint system.

7. The base assembly according to claim 6, wherein one or more clips are arranged in a first half of the ring.

8. The base assembly according to claim 1, wherein the functional module is provided as a camera system comprising a camera, a camera connector, and a cable which is adapted to be held by the at least one of one or more attachment and holding means of the sealing means.

9. The base assembly according to claim 1, wherein the cable is guided from an upper side of the base frame, with the upper side being a side to which the camera connector is attached, to the lower side of the base frame, with the lower side being a side to which the camera is attached, around at least half of a circumference of the sealing means, and into the vehicle, in response to the base assembly being attached to the vehicle.

10. The base assembly according to claim 1, wherein the soft component engages a rim of the base cover at the pivot joint system end.

11. A rear view device with a head assembly moveably attached to the base assembly according to claim 1.

* * * * *